US007162452B1

(12) United States Patent  
Epstein

(10) Patent No.: US 7,162,452 B1  
(45) Date of Patent: Jan. 9, 2007

(54) KEY DISTRIBUTION VIA A MEMORY DEVICE

(76) Inventor: Michael A. Epstein, 16 Dorset Rd., Spring Valley, NY (US) 10977

( * ) Notice: Subject to any disclaimer, the term of this patent is extended or adjusted under 35 U.S.C. 154(b) by 0 days.

(21) Appl. No.: 09/454,349

(22) Filed: Dec. 3, 1999

Related U.S. Application Data

(60) Provisional application No. 60/126,169, filed on Mar. 25, 1999.

(51) Int. Cl.  
*G06Q 99/00* (2006.01)  
*H04K 1/00* (2006.01)  
*H04L 9/00* (2006.01)

(52) U.S. Cl. .............................. 705/52; 705/53; 705/54; 705/55; 705/56; 705/57; 380/277; 380/278; 380/279; 380/280; 380/281; 380/282; 380/283; 380/284; 380/285; 380/286

(58) Field of Classification Search ............... 705/52, 705/50, 51, 53, 54, 55, 56, 57, 58, 59, 60, 705/61, 62, 63, 64, 65, 66, 67, 68, 69, 70, 705/71, 72, 73, 74, 75, 76, 77, 78, 79, 80; 380/230, 221, 277, 278, 279, 280, 281, 282, 380/283, 284, 285, 286, 44, 45, 46, 47  
See application file for complete search history.

(56) References Cited

U.S. PATENT DOCUMENTS 5,144,665 A * 9/1992 Takaragi et al. ............... 380/30

(Continued)

FOREIGN PATENT DOCUMENTS

DE 0 672 991 B1 * 3/1995

(Continued)

OTHER PUBLICATIONS

Garfinkel, Simson; Go for public keys: public keys are the safest way to secure your data today. (The Critical Distinction)(computer security issues)(one of five articles in "Your Best Defense")(Column), Windows Sources, vol. 3, No. 0, p. 86(1).*

(Continued)

*Primary Examiner*—James P. Trammell  
*Assistant Examiner*—Cristina Owen Sherr  
(74) *Attorney, Agent, or Firm*—Stephen B. Salai, Esq.; Michael J. Didas, Esq.; Harter Secrest & Emery LLP

(57) ABSTRACT

A memory element is provided in the recording medium that is readable but not writeable by external devices, and whose content changes each time select material is recorded onto the medium. The content of this memory element forms a unique encryption key for encrypting the content encryption key. This encrypted content encryption key is further encrypted using a public key that corresponds to a private key of the intended rendering device. Although the unique encryption key is determinable by reading and processing the content of the externally read-only memory element, the decryption of the content encryption key requires both the unique encryption key and the private key of the intended rendering device. Because the unique encryption key is based on a content value of the read-only memory element that is unique to each recording to the recording medium, a subsequent illicit re-recording of the original encrypted content material onto the recording medium (a replay attack) will not provide the same unique encryption key as the unique encryption key used to originally encrypt the content encryption key. Because the unique encryption key of the replay attack differs from the original unique encryption key used to encrypt the content encryption key, the rendering device will be unable to decrypt the content encryption key, and thereby will be unable to decrypt the content material, and the replay attack will fail.

20 Claims, 1 Drawing Sheet

U.S. PATENT DOCUMENTS

| | | | | |
|---|---|---|---|---|
| 5,719,938 | A | * | 2/1998 | Haas et al. .................... 705/52 |
| 5,857,021 | A | * | 1/1999 | Kataoka et al. ................ 705/54 |
| 5,864,683 | A | * | 1/1999 | Boebert et al. ........ 395/200.79 |
| 5,933,498 | A | * | 8/1999 | Schneck et al. ................ 380/4 |
| 6,289,455 | B1 | * | 9/2001 | Kocher et al. ............... 713/194 |
| 6,587,837 | B1 | * | 7/2003 | Spagna et al. ................ 705/50 |

FOREIGN PATENT DOCUMENTS

| | | | |
|---|---|---|---|
| DE | 0 809 244 A2 | * | 11/1996 |
| EP | 0 672 991 | | 9/1995 |
| EP | 0672991 A2 | | 9/1995 |
| EP | 0 717 566 A1 | * | 6/1996 |
| EP | 0717566 A1 | | 6/1996 |
| EP | 0 809 244 | | 11/1997 |
| EP | 0809244 A2 | | 11/1997 |
| EP | 0809244 A3 | | 11/1997 |
| WO | 9605673 A1 | | 2/1996 |
| WO | PCT/US95/10221 | * | 2/1996 |
| WO | 9847258 | | 10/1998 |

OTHER PUBLICATIONS

Cecere, Carl; Ruppert, William H.; A framework for security. (information systems); Journal of Electronic Defense, vol. 15, No. 1, p. 54(4), Jan. 1992.*

* cited by examiner

KEY DISTRIBUTION VIA A MEMORY DEVICE

CROSS-REFERENCE TO RELATED APPLICATIONS

This application claims the benefit of U.S. Provisional Application No. 60/126,169, filed Mar. 25, 1999.

BACKGROUND OF THE INVENTION

1. Field of the Invention

This invention relates to the field of electronic security, and, in particular, to the encryption and decryption of copy-protected content material.

2. Description of the Related Art

Digital recording techniques are commonly used to record copy-protected content material, such as, audio and video recordings. Subsequent digital copies of such digital recordings are virtually indistinguishable from the original, and offer the same quality as the original.

As the ease of illicitly providing high-quality reproductions of copy-protected content material increases, the need for preventing such reproductions increases. At the same time, however, a legitimate purchaser of such copy-protected content material expects to be able to make copies of the content material for his or her own use. A number of "policy groups", such as the SDMI (Secure Digital Music Initiative), and others, have been formed in an attempt to reach an equitable compromise between the opposing needs of the owners or vendors of the copy-protected material and the purchasers of copies of the copy-protected material. As a result of the actions of these policy groups, a variety of encryption and decryption techniques have been developed, and continue to be developed, to limit the number of times that a copy of copy-protected content material can be made, or to limit the number of times that a copy may be played-back, or to place an expiration time on a copy. Similarly, encryption and decryption techniques have been developed that limit the type of actions than can be applied to the copy. For example, a copy may have a limit to the number of times that it can be copied, independent of the number of times that it can be played-back. A "copy-once, play-always" authorization would allow for an infinite number of play-backs, but only one copy; a "copy-never, play-10" authorization would allow for ten play-backs, and no copies of this copy. For ease of reference, the term "rendering" is used herein to identify either a recording function or a playback function. For example, a recorder renders the material to a recording medium, a CD-player renders the material to an audio system, a DVD-player renders the material to an audio-visual system, and so on. In addition to limiting the number and type of renderings, the device that provides the limited-use copy may also limit the number of limited-use copies of the copy-protected material that are simultaneously available at any given time. That is, for example, if the number of limited-use copies at any given time is limited to ten, the compliant recorder will not provide an eleventh copy until at least one of the first ten copies is "checked-in", and marked as being expired, if not already so marked.

In a typical embodiment of a limited-use copy, the copy contains a counter or ticket that stores, in a secure manner, an indication of the authorized rights, and a compliant playback device updates the counter with each rendering or each passage of time, as appropriate for the particular authorized right. In the typical embodiment, the device that provides the limited-use copy and the device that renders the material share a cryptographic key or set of keys that are used to prevent the rendering of the material on an illicit device, and to prevent a modification to the authorization parameters. Typically, the content material is encrypted using a symmetric key, and this key is communicated to the rendering device in an encrypted form, using an asymmetric public key that corresponds to a private key that is associated with the rendering device. In this manner, only the intended rendering device is able to decrypt the encrypted content material. This asymmetric public key is also used to encrypt the authorization rights associated with the encrypted content material.

By limiting the number of simultaneously authorized copies, a compliant provider of the copies cannot be efficiently utilized for an illicit mass production. By limiting the number of times that a copy of copy-protected material can be rendered, the resale value of such a limited-use copy is substantially reduced, thereby diminishing the incentive to illicitly reproduce and sell these copies. At the same time, the purchaser of the original copy of the content material is provided virtually unlimited reproduction rights. The burden on the user of re-recording the expired copies from the original purchased copy is viewed to be minimal, particularly if the number of times that the copy can be rendered before expiring is reasonably high, the number of simultaneous copies is reasonably high, and the effort required for the re-recording is low. The use of an expiration time, in lieu of an expiration based on the number of renderings, can also be used to minimize the resale value of each copy, yet allow the purchaser substantially unlimited reproduction rights. A time-based system based on real time (clock time), however, is not often effective for copy protection, because many illicit copies could be made in a relatively short amount of time, and, conversely, most purchasers would be dissatisfied with a time limit that was not related to whether the material was being rendered during that time. Typically, time-based systems are based on a duration of time that the material is actually rendered, rather than real (clock) time.

Another scenario for the use of time-limited or usage-limited copies of copy-protected material is for the legitimate vendors of the copy-protected material to sell time-limited or usage-limited copies directly, potentially at a lower cost than the above referenced copies that allow for unlimited reproductions. For example, a limited-use copy may be provided via a download from the Internet, or via a broadcast from a provider, such as a cable or satellite television program provider, with an option to purchase an unlimited-use copy. Or, limited-use copies can be provided as rental items, such as a single-use rental of a video recording that does not require the return of the recording within a limited time period. These and other scenarios for the use of limited-use copies of copy-protected content material can be expected to become increasingly common.

One known method of overcoming a limited-use copy protection scheme is termed a "replay attack". In this method, a bit-for-bit copy is made of the limited-use copy while it contains its full allocation of authorized usage or time, and stored in an archive. Although this copy cannot typically be used in a non-compliant rendering device, because the material is stored in a secured form, this copy can be used, or replayed, on a compliant device by re-recording the bit-by-bit copy of the maximum allocated copy back onto the recording medium. Thus, even though the resale value of a limited-use copy of content material will be lower than the value of an unlimited-use copy, a counterfeiter may choose to provide such illicit limited-use copies, because of the ease of creating the copies, and the ease of overcoming the limited-use copy protection scheme.

SUMMARY OF THE INVENTION

It is an object of this invention to provide an encryption method that precludes a replay attack on a limited-use protection scheme. It is a further object of this invention to provide a recording medium having properties that preclude a replay attack. It is a further object of this invention to provide a system that provides limited-use copies of copy-protected material that precludes a replay attack.

These objects and others are achieved by providing an encryption system having a secure item that is substantially unique for each recording of a copy of copy-protected content material. A memory element is provided in the recording medium that is readable but not writeable by external devices, and whose content changes each time material is recorded onto the medium. In a preferred embodiment, the content of this memory element is used to form a unique encryption key that is used to encrypt the encryption key that is used to encrypt the content material. This unique encryption of the content encryption key is further encrypted using a public key that corresponds to a private key of the intended rendering device. Although the unique encryption key is determinable by reading and processing the content of the externally read-only memory element, the decryption of the content encryption key requires both the unique encryption key and the private key of the intended rendering device. Because the unique encryption key is based on a content value of the read-only memory element that is unique to each recording to the recording medium, a subsequent illicit re-recording of the original encrypted content material onto the recording medium (a replay attack) will not provide the same unique encryption key as the unique encryption key used to originally encrypt the content encryption key. Because the unique encryption key of the replay attack differs from the original unique encryption key used to encrypt the content encryption key, the rendering device will be unable to decrypt the content encryption key, and thereby will be unable to decrypt the content material, and the replay attack will fail.

BRIEF DESCRIPTION OF THE DRAWING

The invention is explained in further detail, and by way of example, with reference to the accompanying drawing wherein.

DESCRIPTION OF THE PREFERRED EMBODIMENTS

Figure 1:
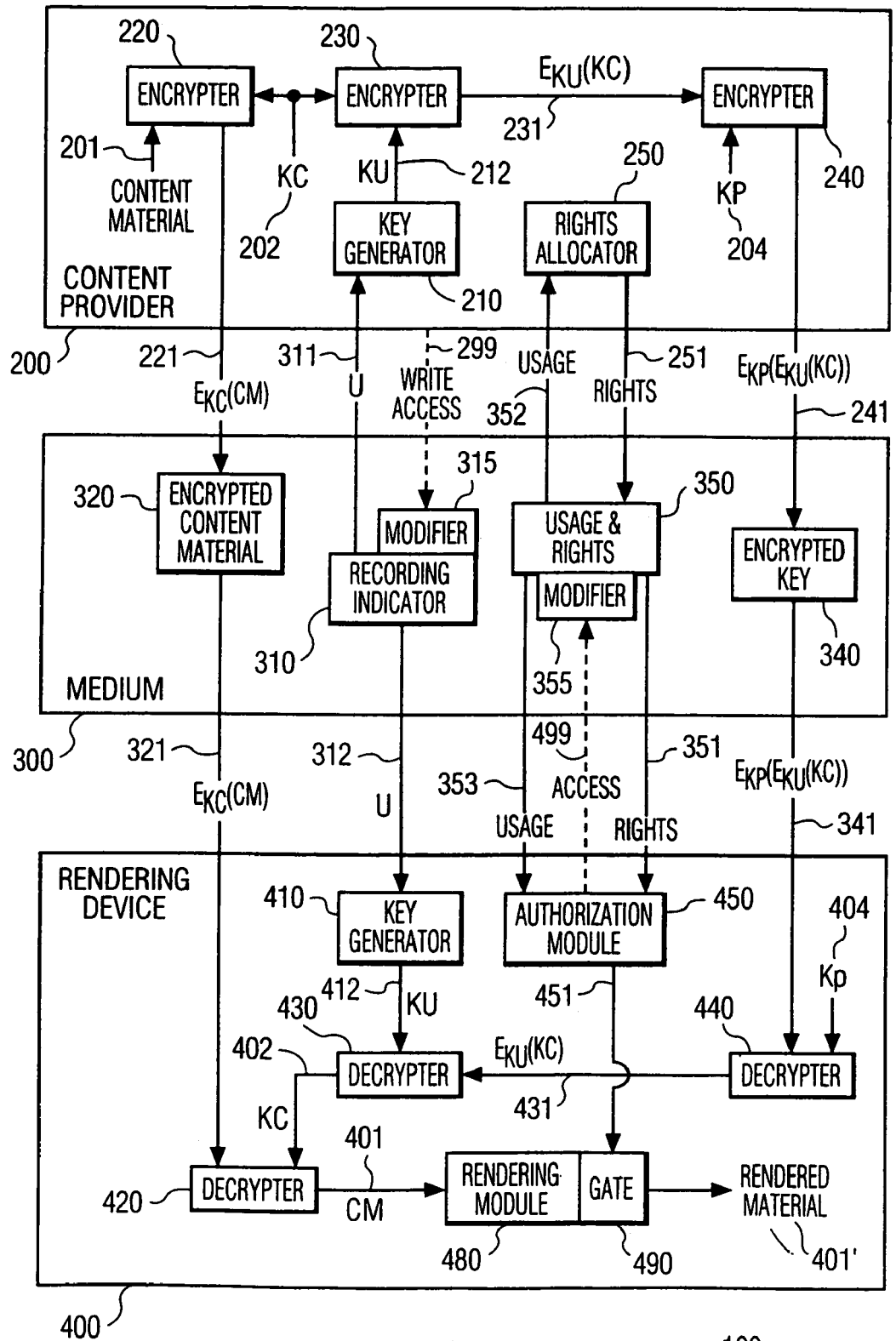
FIG. 1 illustrates an example block diagram of an encryption system that provides a copy of copy-protected material that precludes replay attacks in accordance with this invention.

FIG. 1 illustrates an example block diagram of an encryption system 100 that provides a copy of copy-protected material on a recording medium 300 that precludes replay attacks in accordance with this invention. The encryption system 100 includes a content provider 200, a recording medium 300, and a rendering device 400. The content provider 200 records encrypted content material and associated information to the recording medium 300, for rendering by the rendering device 400. Any of a variety of conventional recording techniques can be employed, depending upon the form and structure of the medium 300.

For ease of understanding, the components utilized to write to and read from the medium 300 are not illustrated in the example block diagram of the content provider 200 and rendering device 400 in FIG. 1.

In accordance with this invention, the recording medium 300 includes a recording indicator 310 that contains a unique number U. A new number U is created each time encrypted content material 221 is stored to the memory area 320 of the medium 300. Any number of techniques may be used to facilitate the production of this unique number U. In a straightforward embodiment of a solid-state medium 300, the recording indicator 310 includes a counter that is incremented by a modifier 315 with each write access 299 to the memory 320. In a more complex embodiment, the modifier 315 includes a random number generator that provides a new random number to the recording indicator 310 with each write access 299 to the memory 320. Other techniques are also viable, such as the use of a data-time stamp, and others.

In a preferred embodiment of this invention, the recording indicator 310 is embodied in the "disk sector tag" commonly associated with sectors of memory in a computer memory device. Corresponding tags can be written to optical or magnetic disks via a secure disk drive analogously to the case of computer memory. That is, as the encrypted content material 221 is written to each sector of the memory area 320, the modifier 315 changes the disk sector tag of each sector that is written to. One or more of these changed disk sector tags thereby form the unique number U. By associating the recording indicator 310 with specific sectors, writes to other sectors within the medium 300 will not affect the tags associated with the sectors used to form the memory block 320 for storing the encrypted content material 320. In this manner, memory write operations are distinguishable, even if the medium 300 is not physically segregated into discrete memory blocks 310, 320, 340, 350 as illustrated in FIG. 1.

It should be noted that the number U can be the collection of all tags in the entire memory thus creating a single key KU for the entire contents of the media. Alternatively the number U and corresponding key KU can be for a single "disk sector" so that each section of the media can be separately rewritten without affecting the other sections of the media.

To prevent a replay attack, the recording indicator 310 is configured to be externally readable, but not externally controllable. That is, at each occurrence of a write access to the memory 320, the content recording indicator 310 changes in a manner that is not externally controllable. In this manner, if the legitimate contents in the medium 300 are copied to an archive, and then subsequently re-recorded on the medium 300 from the archive, the recording indicator 310 will, via the modifier 315, contain a different value U' (not illustrated) in the recording indicator 310 than the value U that had been in the recording indicator 310 when the legitimate contents were stored in the medium 300. Note that this value U' in the recording indicator 310 will be different than the original value U, regardless of whether a total bit-by-bit copy of medium 300 is archived, including a copy of the original value U. That is, because the recording indicator 310 is not externally controllable, the original value U cannot be rewritten into the recording indicator 310. In this manner, because a copy of the original contents of the medium 300 can be distinguished from the original contents, by comparing the original value U with the copy-produced new value U', a replay attack can be prevented.

To facilitate this replay defense, the original value U must be reliably and securely communicated to the rendering device 400 that enforces this defense. Any number of techniques may be employed to securely communicate the original value U. For example (not illustrated), the original value U could be "digitally signed" by content provider 200, and this digitally signed information stored in the medium 300. A compliant rendering device 400 will verify that the digitally signed information is authentic, and then compare the digitally signed original value U to the current value of the value U in the recording indicator 310. If the current value U matches the digitally signed value U, the rendering device 400 is assured that the encrypted content material 321 from the memory 320 is the encrypted content material 221 that was originally stored in the memory 320. If the current value U does not match the digitally signed value U, the rendering device 400 recognizes the attempted replay attack, and precludes a rendering of the content material.

In a preferred embodiment, as illustrated in FIG. 1, the value U 311 is used by the content provider 200 to encrypt an item when the encrypted content material 221 is originally recorded, and the value U 312 is subsequently used by the rendering device 400 to decrypt the item. If the value U 311 changes between the time the encrypted content material 221 is originally recorded and the time the rendering device reads the current value U 312, the rendering device 400 will be unable to properly decrypt the item that was encrypted based on the original value U 311. If, on the other hand, the value U 311 that is used by the content provider 200 is the same as the value U 312 that is used by the rendering device 400, the rendering device 400 will properly decrypt the item that was encrypted based on the value U 312. In the example of FIG. 1, the aforementioned item that is encrypted based on the value 311 is a content key 202 that is used to encrypt, and subsequently decrypt the encrypted content material 221.

In the example embodiment of FIG. 1, an encrypter 220 is illustrated for providing the encrypted content material $E_{KC}(CM)$ 221 based on the content key KC. A key generator 210 creates a key KU 212 from the value U 311, typically via a hashing function. In a preferred embodiment wherein the recording indicator 310 is embodied within the disk sector tag for each written sector, the key generator 210 creates the key KU 212 by iteratively hashing the unique value in each disk sector tag corresponding to the encrypted content material memory 320, and optionally, as discussed below, the unique value in each disk sector tag corresponding to the rendering rights memory 350.

An encrypter 230 uses the key KU 212 to encrypt the content key KC 202 to provide an encrypted content key $E_{KU}(KC)$ 231. At the rendering device 400, this encrypted content key $E_{KU}(KC)$ is shown as reference item 431. A key generator 410, similar to key generator 210, is used to generate a key KU 412, based on the value U 312 in the recording indicator 310 at the time that the medium 300 is read by the rendering device 400. A decrypter 430 decrypts the encrypted content key $E_{KU}(KC)$ 431 using this key KU 412. If the value U 312 corresponds to the original value U 311 that was used in the encryption of the content key KC 202, the decrypter 430 will provide a content key KC 402 that matches the content key KC 202. A decrypter 420 uses the decrypted content key KC 402 to decrypt the encrypted content material $E_{KC}(CM)$ 321 from the memory 320 of the medium 300. If the value U 312 does not correspond to the original value U 311, the rendering device key KU 412 will not match the original key KU 212, the decrypted content key KC 402 will not match the original content key 202, and, therefore, the decrypted content material CM 401 will not match the original content material 201, and will be substantially unrenderable.

Also illustrated in the example embodiment of FIG. 1, the content provider 200 includes an optional encrypter 240 that further encrypts the encrypted content key $E_{KU}(KC)$ 231 using a public key KP 204 that is associated with the rendering device 400. In this manner, the encrypted content key $E_{KU}(KC)$ 231 cannot be decrypted by a device other than the intended receiving device 400, thereby preventing a rendering of the content material 201 by other devices. This doubly encrypted key $E_{KP}(E_{KU}(KC))$ 241 is in a memory 340 of the medium 300. The corresponding rendering device 400 contains a decrypter 440 that decrypts the doubly encrypted key $E_{KP}(E_{KU}(KC))$ 341 from the memory 340 using a private key Kp 404 corresponding to the public key KP 204 of a public-private key pair. This decrypter 440 provides the aforementioned encrypted content key $E_{KU}(KC)$ 431.

For completeness, FIG. 1 illustrates an authorization module 450 in the rendering device 400 that enforces the limited rendering rights discussed in the Background of the Invention, above. Copending U.S. patent application Ser. No. 09/454,350, filed Dec. 3, 1999, to Michael A. Epstein, entitled "USAGE DEPENDENT TICKET TO PROTECT COPY-PROTECTED MATERIAL", presents a method and system for allocating and enforcing limited rights to each copy of encrypted content material that is stored on a recording medium, and is incorporated by reference herein. As applied to this invention, the content provider 200 includes a rights allocator 250 that stores allocated rights 251 on the recording medium 300. These allocated rights 251 are based on a usage parameter 352 of the medium 300 at the time that the encrypted content material 221 is recorded to the medium 300. The rights 251 may be encoded, for example, as a ticket that is "punched" by a modifier 355 each time the medium is accessed 499 by a rendering device 400, or as a counter that is decremented, and so on. In accordance with another aspect of this invention, the recording indicator 310 may be configured to change its stored value U whenever the memory area 350 that contains the rights are written to from an external source, such as the content provider 200, or by an illicit attempt to modify the rights stored by the content provider 200. As discussed above, if the retrieved value U 312 differs from the original value U 311, the decrypted content material 401 will not match the original content material 201, and will be virtually unrenderable. If the rights in the memory 350 and the encrypted content material in the memory 320 have not been externally changed, the decrypted content material 401 will match the original content material 201 and will be renderable. An authorization module 450 prevents the rendering 401', however, if the usage 353 of the medium 300 has exceeded the rights 351 allocated to the medium 300, via the gate 490. The rendering module 480 represents the components that render the decrypted content material 401, such as an audio system, an audio-video system, a computer system, and the like. The gate 490 represents any of a variety of means commonly available for inhibiting the production of the rendered material 401' from the content material 401 by the authorization module 450.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

I claim:

1. A recording medium comprising:
   a first memory for storing encrypted content material via a first write operation;
   a recording indicator for generating and storing a unique identifier at each occurrence of the first write operation; and
   a second memory for storing, via a second write operation, a secure item based on the unique identifier when the encrypted content material is stored.

2. The recording medium as claimed in claim 1, wherein:
   the secure item includes an encrypted key for facilitating a decryption of the encrypted content material, the encrypted key being dependent upon the unique identifier.

3. The recording medium as claimed in claim 1, wherein:
   the recording indicator includes a counter incremented by a recording device when the recording device records the encrypted content material.

4. A rendering device for rendering content material corresponding to encrypted content material contained on a recording medium, the recording medium also including a recording indicator for generating and storing an original unique identifier and subsequently a current unique identifier in response to first write operations of said encrypted content material being written into the recording medium, the rendering device comprising:
   one or more decrypters for decrypting the encrypted content material based on a current value of the recording indicator, said one or more decrypters provide the content material only when the current unique identifier of the recording indicator corresponds to the original unique identifier of the recording indicator; and
   a renderer configured to render the content material.

5. The rendering device as claimed in claim 4, wherein said rendering device further comprises:
   an authorization device for controlling the renderer based on a usage-measure associated with the recording medium, and a validity period associated with the content material.

6. The rendering device as claimed in claim 4, wherein said rendering device further comprises:
   a key generator for creating a unique key based on the current value of the recording indicator,
   and wherein the one or more decrypters decrypt the encrypted content material based on the unique key based on the current unique identifier of the recording indicator.

7. The rendering device as claimed in claim 6, wherein the one or more decrypters include:
   a first decrypter for decrypting a doubly encrypted content key based on a private key of the rendering device to provide a singly encrypted content key;
   a second decrypter for decrypting the singly encrypted content key based on the unique key that is based on the current unique identifier of the recording indicator to provide a content key; and
   a third decrypter for decrypting the encrypted content material based on the content key to provide the content material.

8. A provider of content material comprising:
   a recorder for recording encrypted content material and a corresponding secure item on a recording medium, said recorder comprising:
   a first input for receiving content material;
   a second input for receiving a content key;
   a first encrypter for encrypting the content material based on the content key;
   means for writing the encrypted content material on the recording medium in a first writing operation;
   a third input for receiving a unique identifier from the recording medium in response to the first writing operation, said recording medium having a recording indicator for generating and storing a unique identifier at each occurrence of a first writing operation;
   a second encrypter for generating the secure item based on the unique identifier received from the recording medium; and
   means for writing the secure item on the recording medium in a second writing operation.

9. The content material provider as claimed in claim 8, wherein the content material provider further comprises:
   an allocator for allocating rendering rights associated with the encrypted content material,
   and wherein the recorder further records the rendering rights on the recording medium.

10. The content material provider as claimed in claim 8, wherein
    the secure item corresponds to an encryption of the content key based on the unique identifier.

11. The content material provider as claimed in claim 8, wherein said content material provider further comprises:
    one or more encrypters for providing the secure item.

12. The content material provider as claimed in claim 8, wherein said content material provider further comprises:
    a key generator for generating a unique key based on the unique identifier; and
    one or more encrypters for encrypting the content key based on the unique key to produce the secure item.

13. The content material provider as claimed in claim 8, wherein said content material provider further comprises:
    a first encrypter for encrypting the content key based on a unique key that is dependent upon the unique identifier to produce a singly encrypted content key; and
    a second encrypter for encrypting the singly encrypted content key based on a public key that is associated with a rendering device to produce a doubly encrypted content key corresponding to the secure item.

14. A method of providing content material, the method comprising the steps:
    recording encrypted content material on a recording medium in a first write operation, the encrypted content material being dependent upon the content material and a content key; and
    recording a secure item on the recording medium in a second write operation, the secure item being dependent upon a unique identifier generated by and stored in the recording medium upon each first write operation.

15. The method as claimed in claim 14, wherein said method further comprises the step:
    recording rendering rights associated with the encrypted content material on the recording medium.

16. The method as claimed in claim 14, wherein said method further comprises the steps:
    generating a unique key based on the unique identifier; and
    encrypting the content key using the unique key to produce the secure item.

17. The method as claimed in claim 14, wherein the method further comprises the steps:
    generating a unique key based on the unique identifier;
    encrypting the content key using the unique key to produce a singly encrypted content key; and encrypting the singly encrypted content key using a public key associated with a rendering device to produce the secure item.

18. A method of rendering content material from a recording medium that includes encrypted content material, an encrypted content key, and a unique identifier generated by and stored on the recording medium each time said encrypted content material is recorded on said recording medium, the method comprising the steps:

determining a unique key based on the unique identifier;

decrypting the encrypted content key based on the unique key to provide a content key;

decrypting the encrypted content material based on the content key to provide the content material; and rendering the content material.

19. The method as claimed in claim 18, wherein:

the recording medium also includes rendering rights, and the step of rendering the content material is dependent upon the rendering rights.

20. The method as claimed in claim 18, wherein the step of decrypting the encrypted content key includes:

decrypting the encrypted content key based on a private key to provide a singly encrypted content key; and decrypting the singly encrypted content key based on the unique key to provide the content key.

* * * * *